United States Patent
Van de Velde et al.

(10) Patent No.: US 7,170,640 B2
(45) Date of Patent: Jan. 30, 2007

(54) ADEQUATE QUANTISATION IN MULTILEVEL HALFTONING

(75) Inventors: Koen Van de Velde, Duffel (BE); Paul Delabastita, Antwerp (BE)

(73) Assignee: Agfa-Gevaert, Mortsel (BE)

( * ) Notice: Subject to any disclaimer, the term of this patent is extended or adjusted under 35 U.S.C. 154(b) by 1072 days.

(21) Appl. No.: 10/080,143

(22) Filed: Feb. 21, 2002

(65) Prior Publication Data

US 2003/0117653 A1    Jun. 26, 2003

Related U.S. Application Data

(60) Provisional application No. 60/292,583, filed on May 22, 2001.

(30) Foreign Application Priority Data

Mar. 9, 2001  (EP)  ................................ 01000052

(51) Int. Cl.
*G06K 15/00*  (2006.01)
*H04N 1/40*  (2006.01)

(52) U.S. Cl. .................... 358/3.01; 358/3.03; 358/3.06; 382/252

(58) Field of Classification Search ............... 358/3.03, 358/3.05, 1.9, 3.01, 3.06, 3.21, 3.22, 3.24; 382/252, 232, 237, 251, 270
See application file for complete search history.

(56) References Cited

U.S. PATENT DOCUMENTS 4,680,645 A * 7/1987 Dispoto et al. ............ 358/3.02

| | | |
|---|---|---|
| 4,714,964 A | 12/1987 | Sasaki |
| 5,070,413 A | 12/1991 | Sullivan et al. |
| 5,696,612 A | 12/1997 | Thornton |
| 5,805,178 A | 9/1998 | Silverbrook |

FOREIGN PATENT DOCUMENTS

| EP | 0 531 170 A2 | 3/1993 |
|---|---|---|
| EP | 0 670 654 A1 | 9/1995 |

OTHER PUBLICATIONS

European Search Report, EP 01 00 0052, Aug. 2001.

* cited by examiner

*Primary Examiner*—Thomas D. Lee
(74) *Attorney, Agent, or Firm*—Robert A. Sabourin

(57) ABSTRACT

The method reproduces an electronic image, having pixels, as a multilevel halftone image on a multilevel output device having N different allowed output values (possible density levels) by choosing for any pixel p a real subset $S_p$ containing $N_p$ allowed values out of the set S of N allowed levels quantizing the input pixel value of the pixel p to obtain an output pixel value out of the $N_p$ values in $S_p$ by means of a half toning algorithm, rendering the image by rendering the pixels with the output device using the obtained output pixel values.

The real subset may be formed by the allowed output values closest to the input pixel value. The quantization may be done by an error diffusion algorithm The used method prevents occurrence of pixels having deviating densities distorting the output image.

6 Claims, 4 Drawing Sheets

Fig 3A
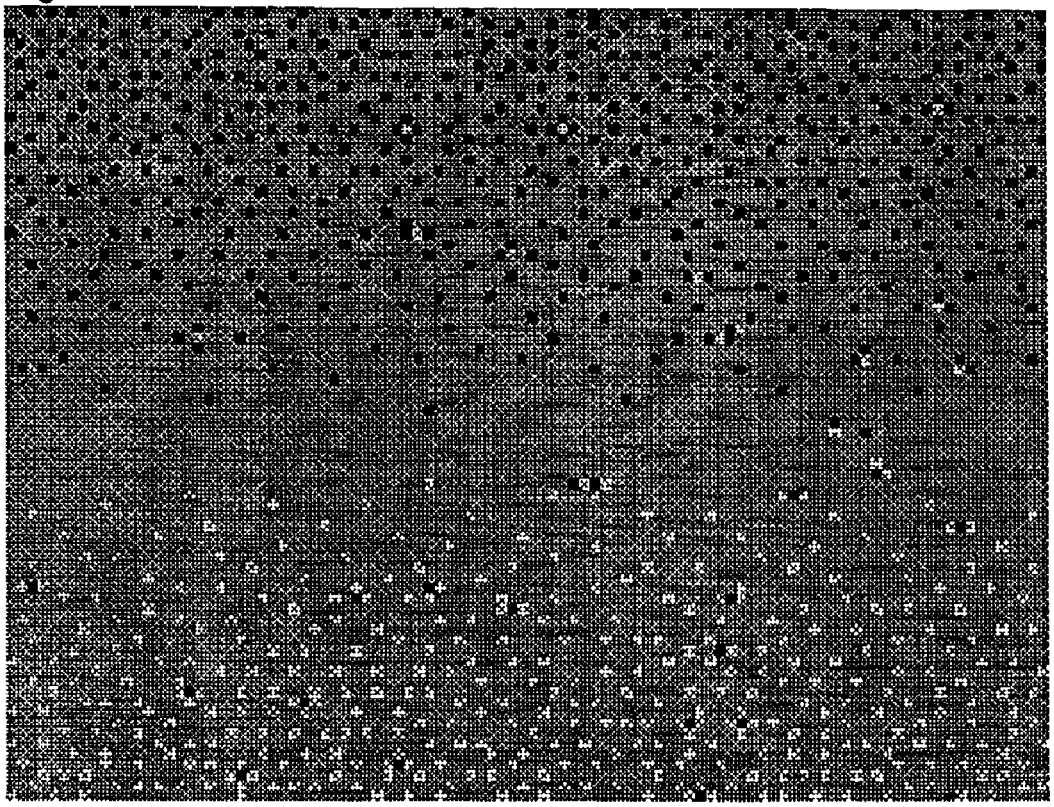
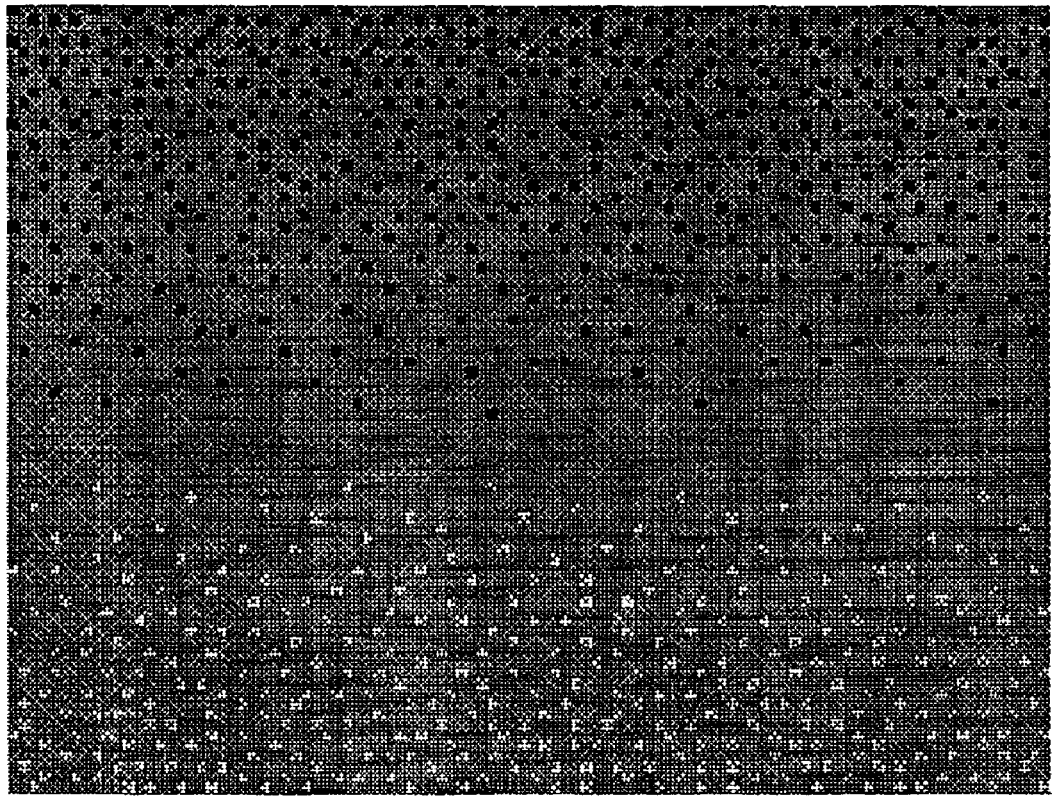
Fig 3B

ADEQUATE QUANTISATION IN MULTILEVEL HALFTONING

This application claims the benefit of U.S. Provisional Application No. 60/292,583 filed May 22, 2001.

FIELD OF THE INVENTION

The invention relates to a method for multilevel halftoning of grey-scale and colour images. In a specific embodiment the invention is related to an improved method for multilevel error diffusion.

BACKGROUND OF THE INVENTION

Traditionally the halftoning for images for printing is done using only two levels. The continuous tone density value of a pixel to be reproduced is approximated by printing an appropriate percentage of high density dots within the area representing the pixel. At a particular position either a dot or no dot can be placed.

Today, ink-jet as well as electrophotographic printers exist that render N>2 intensity or density levels. The inkjet printers are able to deliver variable droplet sizes or use multiple inks of the same hue, but different densities, both procedures resulting effectively in reproduction of multiple possible density levels for one printed dot. Halftoning algorithms, such as error diffusion may be extended to the multilevel (i.e. N>2) case. See e.g. U.S. Pat. No. 4,680,645 by Dispoto et al describing a method for rendering a grey scale image with variable dot sizes. A continuous tone image is an image containing multiple grey levels with no perceptible quantization to them. In a different multilevel halftoning technique all different continuous tone pixel values within a range (e.g. 0–255) are mapped onto the N allowable values within the range N<256. These N allowable values correspond to the N density levels which can be rendered by the multilevel system.

The basic error-diffusion algorithm is illustrated in FIG. 1 and works as follows. The first pixel value 21 of the original image 22 is quantized by a quantizer 23 to the nearest allowed value to obtain the output pixel value 24. The quantization error 25, i.e. the difference between the continuous tone input value 21 and the output pixel value 24, is diffused to future pixels. This may be done by storing the error 25 into a special buffer 26. For the next pixels the method quantizes, the modified pixel value 27=(original pixel value 21+error 25 received from past pixels which is read from the buffer 26) to an allowed quantization level to obtain an output pixel value 24 and again diffuses the newly obtained error 25 to future pixels via the error buffer 26. A more elaborate description can be found hereinafter. Several refinements can be built into the algorithm to avoid the creation of artefacts, such as worms. Examples of such refinements can be found in "Digital Halftoning", R. Ulichney, Cambridge Mass., MIT Press, 1987.

Using more than two allowed values (density levels) i.e. "on" and "off" or high and low density enhances the image quality of the halftone image 28 a great deal compared to only using minimum and maximum values (density levels).

Due to the diffusion of the error 25 however, the output pixel value 24 (density level) wanders around over several allowed output levels of the whole range in a multilevel system. This wandering is fortified when additional features are built into the algorithm, such as putting noise on the diffusion weights (Ulichney) or on the quantizer 23, or using an imprint to get a more homogeneous point distribution, e.g. U.S Pat. No. 5,535,019 Eschbach. The imprint provides a homogenous printed spot distribution in highlighted and dark areas by an increase or decrease of the threshold level based upon a regional input level. When a white pixel is set the threshold is raised while the threshold is lowered when a black pixel is set providing less chance obtaining that another white or black pixel respectively is printed.

This causes that sometimes output pixel values 24 are further away from the original input pixel values 21 than is strictly necessary or desirable. This results in the production of intensity levels giving unwanted, noticeably contrast between halftone dots giving rise to a noticeably more grainy image. The described phenomenon happens mostly at tone levels close to a quantization level. A solution to this problem has not yet been provided in the prior art methods.

OBJECTS OF THE INVENTION

It is an object of the present invention to provide an improved method for a multilevel halftone reproduction system avoiding unwanted density transitions between neighbouring pixels.

It is a further object of the invention to minimize dot noticeability in multilevel halftoning.

In U.S. Pat. No. 5,991,438 (Shaked et al.), the set of halftone colours is limited to tetrahedra in colour space to minimise dot-noticeability metrics. The method explained there has however the drawback that it is restricted to bi-level colour halftoning.

SUMMARY OF THE INVENTION

The above mentioned objects are realised by a method and apparatus having the specific features set out in claims 1, 8 and 9. Specific features for preferred embodiments of the invention are set out in the dependent claims.

Further advantages and embodiments of the present invention will become apparent from the following description and drawings.

BRIEF DESCRIPTION OF THE DRAWINGS

FIGS. 3A and 3B show a comparison of the output result between an error-diffusion method not using the invention and a similar error-diffusion method using the invention.

FIG. 3A shows the output result by using a state of the art multilevel error-diffusion method of an image having a gradually changing density.

FIG. 3B shows the output of the image used for FIG. 3A, as obtained by using the error-diffusion method according to the invention.

DETAILED DESCRIPTION OF THE INVENTION

A prior art and a preferred method according to the invention are described and compared hereinafter in relation to the drawings.

Figure 1:
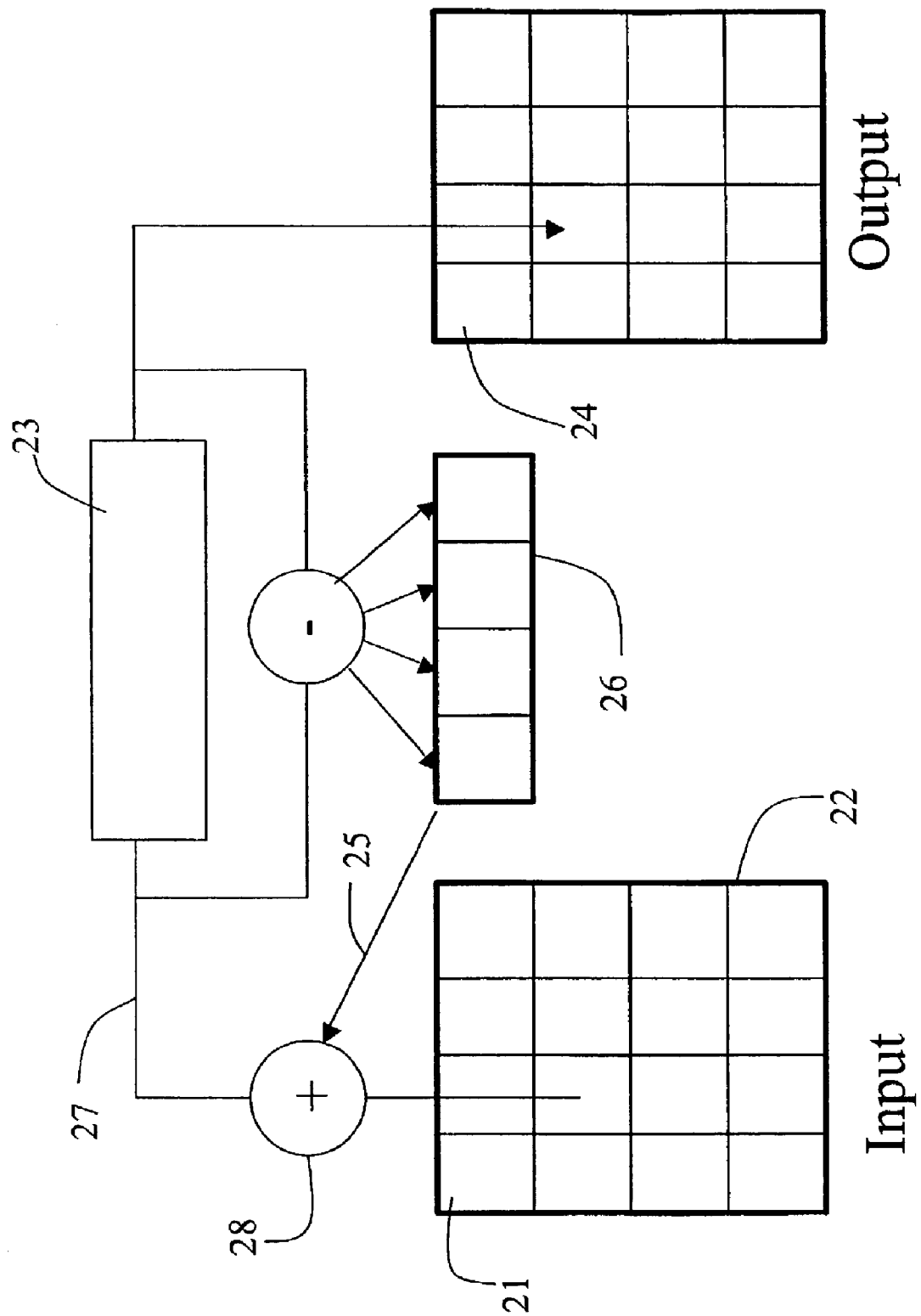
FIG. 1 illustrates a basic multilevel error-diffusion scheme.

FIG. 1 shows a scheme of a state of the art multilevel error-diffusion system. An original image 22 has pixels having an input pixel value 21 in the range of 0–255. The input pixel value 21 is read-out, possible error values 25

(quantization errors) obtained from previous quantized pixels are added to the input pixel value 21 in adder 28 and the modified pixel value 27 is mapped to an allowed level e.g. the set formed by values 0, 15, 31, 47, . . . 255 within the range by comparing the cumulative value 27 to the different threshold values by the quantizer 23 thus determining the different allowed quantized values 24 of the output pixels to be reproduced by the output system. Normally a cumulative value 27 is mapped to the closest allowed value. This can be done by having the threshold values in the quantizer exactly in between the allowed quantized levels. The difference between the cumulative value 27 and the output value 24 is stored as a quantization error 25 which is distributed over subsequent neighbouring pixels. These error values are stored into the error buffer 26 for use when processing later neighbouring pixels. Due to the addition of errors 25 of previously processed pixels, it is possible that the output pixels obtain an allowed value as output pixel value 24 having a large deviation compared to the original value 21 of the input pixel. This can give rise to unwanted, noticeable graininess in the rendered output image as described above. A result having such defective pixels is given in FIG. 3A. The reproduction of an electronic image 22 having a gradually changing density is shown. As can be seen, in the lighter part of the image, some pixels having an abnormal high density occur giving rise to an unwanted distortion of the image. On the upper side of the image, some pixels showing an abnormal brightness are present, also giving rise to a distorted image. Without using the current invention, white pixels invade areas occupied by black and grey pixels, while black pixels invade areas occupied by white and grey pixels.

Figure 2:
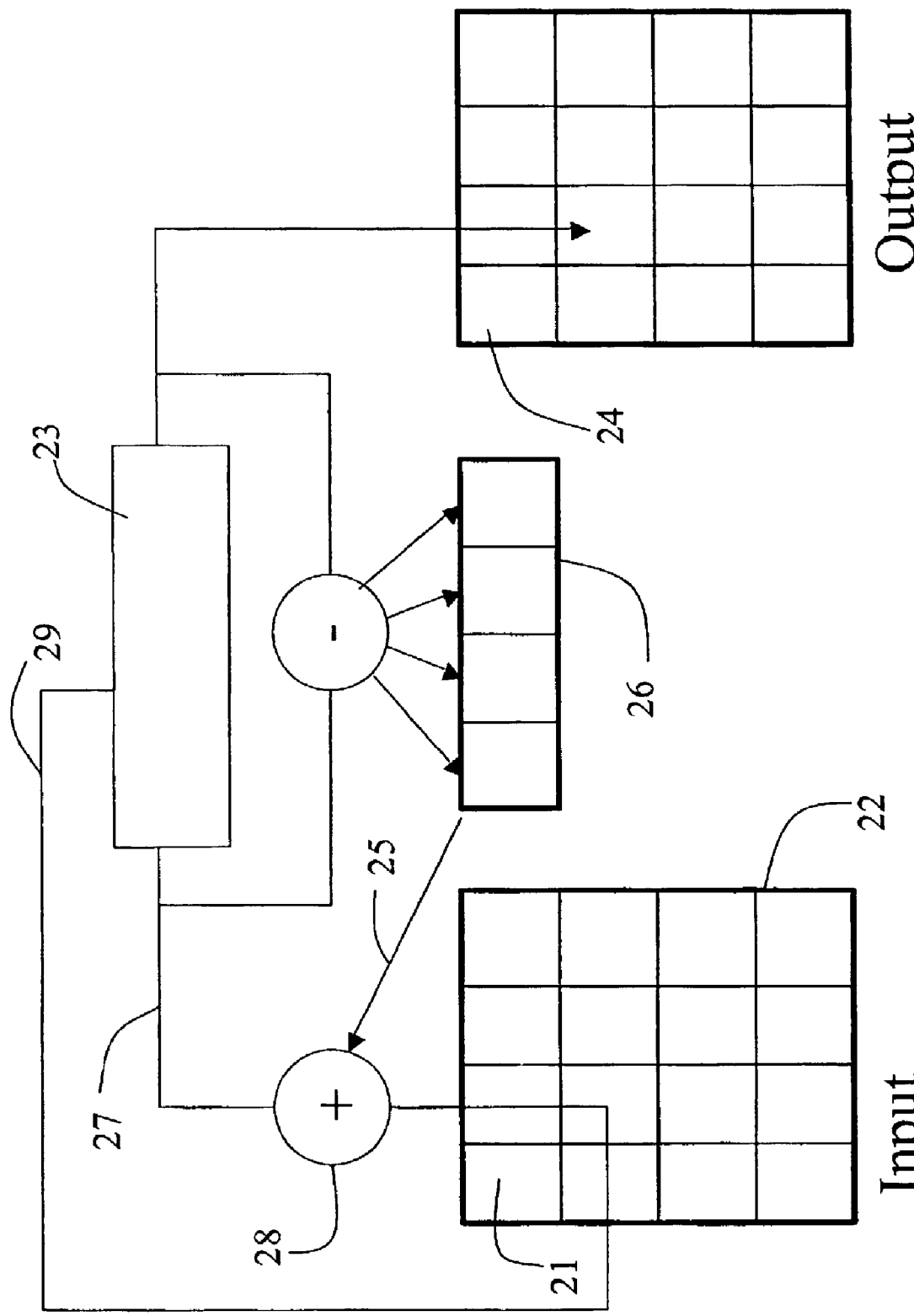
FIG. 2 shows a scheme according to the current invention.

This problem can be solved by using a scheme according the invention as described hereinafter. As shown in FIG. 2 the input pixel value 21 is read out and, if needed, quantization error values 25 obtained from previous pixels are added in adder 28. An additional control 29 to the error diffusion scheme is added in this scheme.

In a preferred embodiment the input pixel value 21 is read out by the control circuit and out of all possible reproducible output values, i.e. allowable values or density levels reproducible by the output system, only the quantizer values just below and above or equal to the original input pixel value 21 are used for quantizing the modified input pixel value 27 and are thus allowed as output pixel value 24. Out of all reproducible and thus allowable output pixel values only the values just below and below or equal to the input pixel value 21 are allowed as output pixel value 24.

The aim is to guarantee that the output pixel value 24 obtained by quantizing the modified pixel value 27, and thus the resulting output density, is close to the original input pixel value 21. By restricting the allowed levels of the output pixel value 24 for each specific pixel to the allowable levels just above or below or equal to the original input pixel value 21 of the pixel, the occurrence of conspicuous density deviations of certain pixels resulting in a distorted image is avoided. In this way there is for the N-level error diffusion at each pixel a choice between maximum two allowed levels only and not all N allowable levels as in the algorithm according to the prior art.

More generally, in determining the output pixel value 24 based upon the modified pixel value 27 of a specific input pixel value, only a real subset of allowed quantizing values or threshold levels is used by the quantizer. A real subset is a subset having at least one element and which has less elements than the original set. In this case when using a N-level multilevel system there are N different allowable values for quantizing the input values. For this case it is desired that a real subset of allowed levels has $N_p$ elements where $N_p$ is an integer and $0 < N_p < N$ The choice of the allowed quantizing values forming the subset can be done using several criteria. Preferable the $N_p$ allowed values forming the real subset are selected according the original input pixel value 21 readout by the control circuit 29. In another embodiment the subset of allowed values can be defined by the input pixel values 21 of the neighbourhood around the specific input pixel. Preferably the allowed values forming the subset can be restricted to the allowable values just above or below or equal to the original input value 21 of the pixel, as mentioned above. When using a multilevel system having a high number of closely spaced density allowable levels which can be rendered, it is possible to include also other allowable values lying further away from the original input pixel value 21 resulting in a larger set of allowed values.

Intuitively there is no need to use more than two allowable levels to render a particular value. The levels just below and just above the actual input pixel value 21 should suffice. An output image using the method according to the invention can be seen in FIG. 3B. No pixels having a conspicuous deviating density value can be seen, resulting in a smooth density gradation from the upper dark area to the lower brighter band.

In a more specific example, let all allowable output pixel values, corresponding to density levels, in a multilevel output system be $Q0<Q1<Q2<Q3$. Suppose the original input pixel value p is such that $Q1 \leq p<Q2$. Let m denote the modified pixel value 27, i.e. the original pixel value 21 p with added quantization error values 25 from previous processed pixels. The chosen quantization value Q is $Q=Q1$ if $|m-Q1| \leq |m-Q2|$ $Q=Q2$ if $|m-Q1|>|m-Q2|$ The subset containing the allowed values is restricted to Q1 and Q2 by the control circuit 29. The Q0 and Q3 levels are excluded as quantizing value for the pixel value p.

The proposed method can be extended to all multilevel systems having the capability of reproducing more than two density values for one pixel.

The control circuit can also work in an alternative ways

A possible embodiment can be created by controlling the error values of previous pixels which are added in adder 28 before the cumulated value is send to the quantizer 23. When e.g. the input pixel value 21 has a value of 35, the error 25 to be added=−7 and the output pixel values are 0, 16, 32, 48, 64 . . . 255, then the error 25 which can be added limited so that it is restricted to the interval [−3:13], in this case the limited error will be limited to −3 so the modified pixel value 27 will remain within the interval [32:48], in this case 32. In this way the only possible results for the output pixel value=35 will be 32. The value of the limitation of the correction value becomes the new error 25 which is to be transferred via the error buffer to the subsequent processed pixels. Thus it can be checked if the error values to be added to the input pixel value are likely to produce an increase or decrease of the cumulated value supplied to the quantizer which would yield a notable deviating output value. In this case the error data added in the adder are limited so as to ensure only output values near the value of the input pixel, thus leading to an output picture without notable deviating output pixels. Corrections of error values due to limiting are further distributed to subsequent processed pixels. In another embodiment the cumulated pixel value 27 can be corrected by a control circuit to obtain a corrected cumulative input value closer to the pixel input value 21 so that the result of the quantizer is close to the original input pixel value avoiding deviating density values in the output image.

The proposed method can also be directly extended to the rendering of colour images in a multilevel colour imaging system. Each separation image or colour component, i.e. the sub-image or image component to be printed with a single ink, may be treated as a separate grey-scale image and processed as such by the method according to the current invention. One such known multilevel colour image reproducing apparatus is the digital press ChromaPress (Trademark owned by Xeikon N.V.) which uses up to 16 density levels for each colour to render continuous tone images using multilevel halftoning. Reproduction of colour component images can be done in a CMY system where only 3 inks are used for reproduction. Other system can use the CMYK system where also black is used for rendering the colour images. Some sytems are even using more different inks to reproduce a colour image.

For each colour component, input pixel values 21 are supplied to the quantizing process. After quantization of the input pixel value 21 of a colour component for a pixel the output pixel value 24 corresponds to an amount of ink of this colour used to render the image pixel.

Without the control circuit 29, deviating amounts of ink can be used for rendering the colour component, due to quantization errors, resulting in conspicuous colour deviations in the output image. When using the extra control circuit 29 only colours will be rendered which are close to the original input colour.

Generally the input pixel colour values 21 are quantized to obtain corresponding output pixel colour values 24 to provide rendering of the colour pixels on the multilevel colour output device. Instead of allowing all allowable colour values, corresponding to every reproducible colour, as a possible result of the quantization, for pixel p the allowed results which can be obtained are preferably restricted to a subset $S_p$ of all allowable colours. Having $N_1$ levels for ink 1, $N_2$ levels for ink 2, . . . , $N_k$ levels for ink k, $S_p$ is obtained as the Cartesian product of subsets $S_{1p}$, $S_{2p}$, . . . , $S_{kp}$, where $S_{ip}$ is the subset of allowed values defined for the i-th ink at pixel p: $S_p = S_{1p} \times \ldots \times S_{kp}$.

A Cartesian product of sets (tables) is formed by all possible combinations of elements(rows) from the sets (tables). If one set has p elements and the second has q elements, the resultant set will have p×q elements.

Preferably this results to the following restriction. Having $N_1$ levels for ink 1, $N_2$ levels for ink 2, . . . , $N_k$ levels for ink k, the k-dimensional hypercube of ink values is divided into $(N_1-1) \times (N_2-1) \times \ldots \times (N_k-1)$ sub-hypercubes. Constraining each of the ink values in the way explained above may be achieved by restricting the quantization colour for a pixel to one of the corners of the sub-hypercube in which the pixel's original colour is situated.

Figure 4:
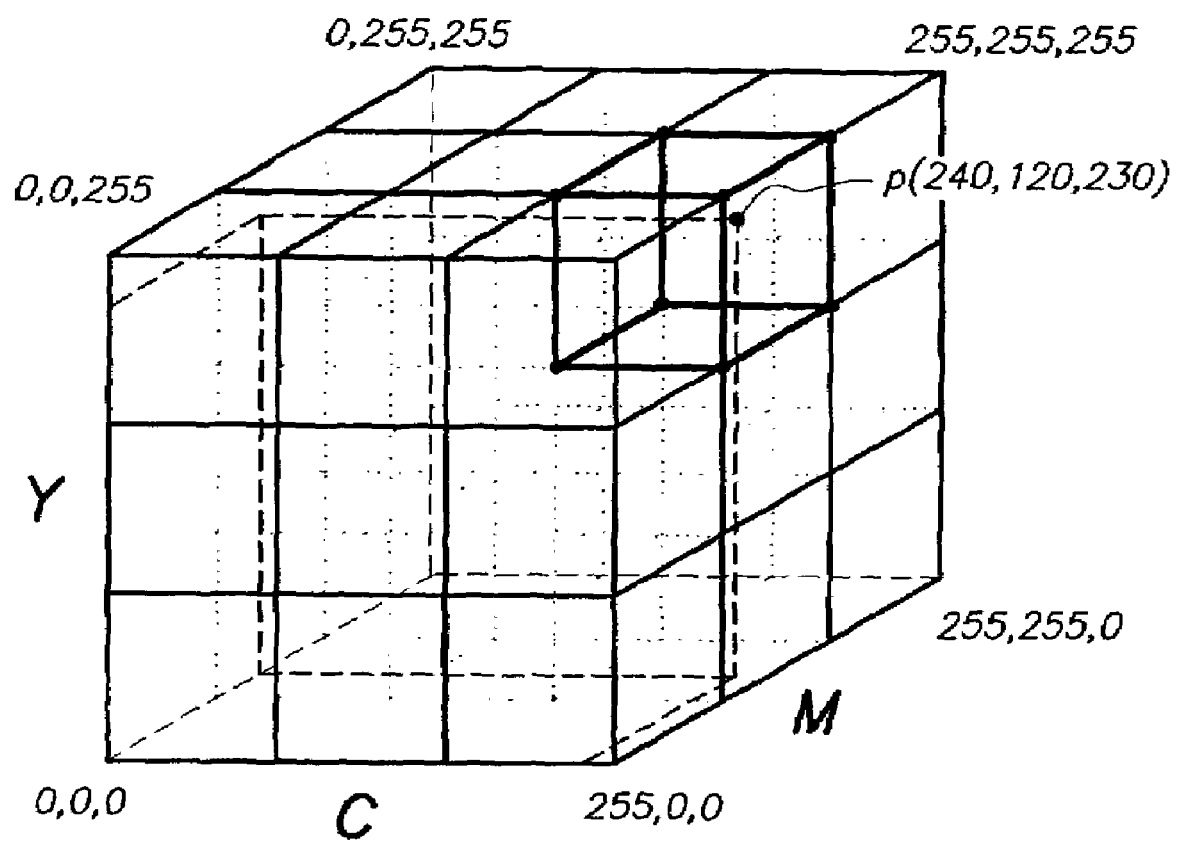
FIG. 4 shows restriction of the quantization colours to the corners of sub-cubes.

An example for a colour system using CMY colorants is illustrated in FIG. 4. For each colorant 4 different "density" levels (N=4) in the range 0-255 are allowed, resulting in a total of $4^3=64$ reproducible colours ($N_c \times N_m \times N_y = 64$) and 27 sub-cubes. Let a pixel having the colorant co-ordinates (240,120,230). By using the control circuit allowing for each colorant only values above or below the input pixel colorant values 21 the set of allowed colorant values is restricted to the possible combinations of the two values for each colour component. This gives rise to 2×2×2=8 possible combinations. These 8 combinations ($N_p=8$) form the corners of the sub-cube in the colorant space (represented by the dots). Other reproducible colour values are prohibited thus avoiding the occurrence of deviating coloured pixels. Excessive deviations of the modified input pixel value 27 due to the error diffusion algorithm are thus avoided and corrected.

In another embodiment, it is possible that not all colorants are quantized using the correction method. The method can be restricted to one or more colorants where a prior art halftoning algorithm would cause excessive deviations.

The quantization constraint discussed here is not restricted to error diffusion, but can be incorporated into other multilevel halftoning algorithms as well.

In one such method, instead of considering only the original s input pixel value 21 of the pixel being processed, to decide about the allowed levels, the control mechanism 29 may use all original input pixel values 24 of pixels in a certain neighbourhood of the pixel being processed. This may eliminate unnecessary variations due to noise in the image.

The problem inherent to the prior art is therefore resolved by a local limitation of the halftone levels to a subset of all allowed levels. It will be appreciated that 'limiting' is to be understood both in the sense of actually restricting the number of levels as well as making certain levels far less attractive than other levels by including an additional penalty for them.

A possible penalty system which can be applied uses the adjustment of the threshold values determining which quantization level is chosen.

In a system without penalty, threshold value are situated exactly in between the allowable output pixel values. E.g. when allowable pixel values are: 0, 16, 32, 48, . . . , the threshold values would be 8, 24, 40, . . . . This means e.g. that for the (modified) input pixel values 27 between 16 and 32 half of the values, i.e. the values 16, 17, 18, 19, 20, 21, 22, 23, will result in the output value 16 and the other half of the values, i.e. 24, 25, 26, 27, 28, 29, 30, 31, will result in the output value 32.

In the system having a penalty, threshold values would not be located in the centre of the quantization values. Between 16 and 32 the threshold value could be 28 so that pixel input values 16 to 27 give an output value of 16 and only 28, 29, 30, 31 will result in the output value 32.

In general the threshold value determining the quantization level is situated right in between the quantization levels as described above using Q0, Q1, Q2 and Q3. By placing the threshold level close to the value having a large deviation compared to the original input value will give less chance that this large deviating value will be obtained as output pixel value.

For the above mentioned example the criteria for choosing the quantization value can be changed to:

$Q=Q0$ if $|m-Q1|>2\times|m-Q0|$ $Q=Q1$ if $|m-Q1| |m-Q2|$ and $|m-Q1| 2\times|m-Q0|$ $Q=Q2$ if $|m-Q1|>|m-Q2|$ and $|m-Q1| 2\times|m-Q2|$ $Q=Q3$ if $|m-Q2|>2\times|m-Q3|$ This effectively changes the "threshold value" so that Q2 is less likely to be obtained than Q1.

As already noted in the background section, the proposed method is of particular advantage in combination with methods that are devised to yield more homogeneous dot distributions. One example is the use of an imprint function (U.S. Pat. No. 5,535,019 Eschbach). This technique is based on threshold modulation with a function, called the imprint function, which depends on the placements of the previous dots. Whenever a dot is placed in the highlight or shadow region, the threshold used for future pixels is modified such that it inhibits the alignment of dots in worm artefacts. Modulating the threshold is equivalent to modulating the modified pixel value 27 and therefore this method is extended to the multilevel case, where thresholding is replaced by quantization. Other methods that yield more homogeneous dot distributions are those of Levien (U.S. Pat. No. 5,917,614) and Marcu (Journal of Electronic Imaging 9(1), 46–51 (2000)). These two methods eliminate worm artefacts by using distance constraints for dot placement. A minimum distance between dots is forced by the algorithm, depending on the grey level. As explained, the method of the current invention eliminates unnecessary density variations created by accumulation of errors in the multilevel versions of such algorithms. In the Levien method the error diffusion threshold is modulated using a bias value based on e.g. in function of the square of the distance to the nearest previously generated dot. This can be combined with the extra restriction of output pixel values 24 by the control circuit 29.

In the above description the input pixel values 21 of the continuous tone pixels having a value in a certain input range are mapped to N allowed levels within the same range. It is however possible to map these input pixel values 21 to an other range, e.g. Instead of mapping the input pixel values 21 of the range 0–255 to 16 allowed levels within the range 0–255, we can map them to 16 levels in the range 0–15. The handling of errors for the error diffusion algorithm would in this case be conducted in another way but would deliver the same technical result as the above described embodiments. This can be done by multiplying the error obtained in the 0–15 range with 17 prior to addition in the adder 28.

After obtaining an output pixel value 24 for each pixel the image can be rendered by the multilevel output device. Each pixel is rendered with a density level corresponding to the output pixel value 24.

Having described in detail preferred embodiments of the current invention, it will now be apparent to those skilled in the art that numerous modifications can be made therein without departing from the invention as defined in the appending claims.

Parts List
21. input pixel value (signal)
22. original image
23. quantizer
24. output pixel value (signal)
25. quantization error
26. error buffer
27. modified pixel value or cumulative pixel value
28. adder
29. control circuit

The invention claimed is:

1. The method for transforming an input image comprising pixels having a first state out of a first set of M (M>2) possible states into a halftone image comprising quantized pixels having a second state out of a second set of N possible states, said second set being a real sub-set of said first set, the method comprising the steps of:
   obtaining an input pixel from said input image, said input pixel having a first error corresponding to an error between a first modified pixel value and a first quantized pixel value;
   modifying said input pixel to obtain a next modified pixel value by adding at least a portion of the first error;
   selecting a third set of P possible states, said third set being a real sub-set of said second set;
   quantizing said next modified pixel value to obtain a next quantized pixel value by selecting one state out of said third set; and
   calculating a next error as a difference between said next modified pixel value and said next quantized pixel value,
   wherein the step of selecting a third set depends on a state of said input pixel.

2. The method of claim 1, wherein said first, second and third sets of states of a pixel correspond with intensity levels of the pixel.

3. The method of claim 1, wherein said first, second and third sets of states of a pixel correspond with combinations of ink levels of the pixel.

4. The method according to claim 1, further comprising a step of rendering said halftone image using said second set of N states.

5. A controller for transforming an input image comprising pixels having a first state out of a first set of M (M>2) possible states into a halftone image comprising quantized pixels having a second state out of a second set of N possible states, said second set being a real sub-set of said first set, said controller comprising:
   means for obtaining an input pixel from said input image, said input pixel having a first error corresponding to an error between a first modified pixel value and a first quantized pixel value;
   means for modifying said input pixel to generate a next modified pixel value by adding at least a portion of the first error;
   means for selecting a third set of P possible states, said third set being a real sub-set of said second set;
   means for quantizing said next modified pixel value to obtain a next quantized pixel value by selecting one state out of said third set;
   means for calculating a next error as a difference between said next modified pixel value and said next quantized pixel value; and
   means for selecting said third set as a function of a state of said input pixel.

6. A system comprising:
   a controller for transforming an input image comprising pixels having a first state out of a first set of M (M>2) possible states into a halftone image comprising quantized pixels having a second state out of a second set of N possible states, said second set being a real sub-set of said first set, said controller comprising;
      means for obtaining an input pixel from said input image, said input pixel having a first error corresponding to an error between a first modified pixel value and a first quantized pixel value;
      means for modifying said input pixel to generate a next modified pixel value by adding at least a portion of the first error;
      means for selecting a third set of P possible states, said third set being a real sub-set of said second set;
      means far quantizing said next modified pixel value to obtain a next quantized pixel value by selecting one state out of said third set;
      means for calculating a next error as a difference between said next modified pixel value and said next quantized pixel value; and
      means for selecting said third set as a function of a state of said input pixel; and
   a rendering system capable of rendering said second set of N states.

* * * * *